United States Patent [19]

Moraw et al.

[11] 4,034,381

[45] July 5, 1977

[54] THERMOPLASTIC RECORDING APPARATUS

[75] Inventors: Roland Moraw; Günther Schädlich, both of Naurod, Germany

[73] Assignee: Hoechst Aktiengesellschaft, Frankfurt am Main, Germany

[22] Filed: Sept. 24, 1975

[21] Appl. No.: 616,760

[30] Foreign Application Priority Data

Sept. 27, 1974 Germany .......................... 2446208

[52] U.S. Cl. ................................ 346/151; 355/3 R

[51] Int. Cl.[2] .................. G03G 16/00; G01D 15/10

[58] Field of Search .......... 346/74 TP, 74 ES, 74 P, 346/151, 153, 160; 355/3 R, 9, 16; 178/6.6 A

[56] References Cited

UNITED STATES PATENTS

| | | | |
|---|---|---|---|
| 3,062,109 | 11/1962 | Mayo | 346/74 ES |
| 3,518,699 | 6/1970 | Mitchell | 346/74 ES |
| 3,643,263 | 2/1972 | Fowler | 346/74 ES |
| 3,683,405 | 8/1972 | Duck | 346/74 TP |
| 3,781,106 | 12/1973 | Lysle | 355/9 |

OTHER PUBLICATIONS

*Xerox Disclosure Journal*, Sheridon et al., vol. 1, No. 3, Mar. 1976, p. 11.

*Primary Examiner*—Jay P. Lucas
*Attorney, Agent, or Firm*—Richard L. Schwaab

[57] ABSTRACT

A recording apparatus and method utilizing a photothermoplastic recording medium and a carriage mounted corona charging device. Means are provided to delay exposure of the recording medium until vibrations from the carriage have ceased. Means are provided for both manual and automatic operation.

32 Claims, 4 Drawing Figures

THERMOPLASTIC RECORDING APPARATUS

This invention relates to a recording apparatus for recording information in the form of deformation images on a photo-thermoplastic recording material consisting of a flexible support with a photoconductive thermoplastic recording layer disposed thereon.

It is known that deformation images may be recorded on recording materials having a photoconductive thermoplastic layer, by electrostatic charging, image-wise exposure, and heating. Such deformation images may be, inter alia, holograms and/or alpha-numerical graphic representations.

For recording deformation images on recording materials, an apparatus has been used in which a flexible, photoconductive film is placed in contact with a recording film backed by a supporting surface, an electric potential being formed between the backing surface and the electrically conductive layer of the photoconductive film, so that the two films are continuously attracted to each other by electrostatic forces. This causes difficulties when the two films adhering to each other by electrostatic forces are to be separated. It was found that when an electric potential is applied, the adhesion of the films is such that they can not be lifted from each other without difficulties and that there is a risk of at least partially destroying the deformation images. In order to avoid these disadvantages, a device has been proposed which enables a quick and reliable removal of an adherent, electrostatically charged recording material from an electrically conductive backing surface. The recording material used in this device consists of a web of dielectric base film carrying a thermoplastic photoconductive layer on its outer surface. The recording material is transported is sections from a delivery spool onto a take-up spool, guide elements being provided which seize the recording material in its approach to the plane of the backing plate and, together with clamping elements, pull it in a wedge-like direction from the backing plate.

None of the known apparatuses may be used for a continuous and completely automated operation or, optionally, for continuous manual operation.

It is the object of the present invention to provide a recording apparatus for a photo-thermoplastic recording material, in which film transporting, electrostatic charging of the recording material, delaying of exposure to allow the mechanical vibrations of the charging device to fade away before exposure, image-wise exposing, thermal developing, and cooling of the exposed recording material to form deformation images, all may be conducted either by a completely automatic or by a manual operation.

According to the present invention, this object is achieved by a recording apparatus which consists of a camera and a control and voltage supply unit, the latter unit comprising switch-operated switching circuits for feeding the recording material to a camera rostrum and removing it therefrom, for the automatic or manual adjustment of the delay necessary to allow the mechanical vibrations of a sliding carriage to fade away, and for setting the exposure time of the recording material, the heating voltage and time at the rostrum, and the running time of a fan. Additionally, a corona device mounted on a sliding carriage is provided for charging the recording material. The rostrum advantageously comprises a plate of transparent material with a transparent, electrically conductive layer disposed therein which, as the counter-electrode to the electrode of the corona device, is earthed during the electrostatic charging of the recording material and which may serve as a heating layer which may be heated by adjustable voltage inputs from the switching circuit controlling the heating voltage and time. If the exposed recording material is subjected to controlled heat by the heating layer, the charge image is converted into a deformation or relief image which may be erased by heating it to an even higher temperature. For the sake of a low height of the recording apparatus, the sliding carriage carrying the corona device advantageously takes a position laterally from the rostrum in the rest position and is provided with a pressure roller and a lifting roller arranged on a surface facing the recording material, the recording material being passed below one and over the other of these rollers, which are arranged in the form of a drive with a tension roller. The two rollers enable the recording material to be slightly lifted during the advance movement of the carriage. If the recording material is employed in the form of a web of film, the web is advantageously drawn off from a free-wheeling delivery spool, passes over a first guide roller, the rostrum, the pressure roller, the lifting roler, a second guide roller, and is finally wound on a take-up spool driven by a second motor.

Advantageously, a first switch for switching off the movement of the sliding carriage in the final position, second and third switches for switching on and off the high voltage supply of the corona device, and a fourth switch serving as a reversing switch for the movement of the sliding carriage, are arranged along the path of the sliding carriage, all the switches being actuated by a cam arranged on a side of the carriage away from the recording material. The switches, which are in the form of microswitches, are preferably arranged beyond the zone of the rostrum.

As a further feature of the present invention, a first motor is provided for reciprocating the sliding carriage, said motor driving the carriage by a cable line, a tooth belt, a gear chain, a rack, or a spindle.

The take-up spool, which is driven by a second motor by means of a toothed belt, a sprocket or a chain, is advantageously provided with recesses or grooves spaced over its periphery, which may be engaged during rotation of the take-up spool by a fifth switch fixedly mounted near the periphery of the spool and serving to stop the feed of the recording material. The distance between neighboring grooves on the periphery of the spool should be selected such that the time during which the sliding carriage moves from the fourth to the third switch equals the time in which the recording material is conveyed from one groove to the neighboring groove.

In another embodiment of the invention, the recording material is stacked in the form of single sheets in a supply station provided with a stamp for lifting the sheets. In this case, the side of the carriage facing the rostrum is advantageously provided with pnuematic suction cups which serve to transport the individual sheets of recording material. Laterally from the rostrum, a receiving station is advantageously arranged for accommodating the exposed and developed recording material. Further, a hold-down and lifting station for the sheets is provided in the zone of the rotrum. This station consists of holow bars which surround the rostrum and in which a reduced pressure may be produced when the recording material is to be pressed onto the rostrum, and excess pressure is created for lifting it therefrom.

Preferably, the switching circuit controlling the change of recording material comprises a first and a second relay connected in series with a first motor for the movement of the carriage, and a third relay to which the second motor is connected. Further, the third relay is connected with the fifth switch and the fourth switch, and a start switch and the first switch are connected with the first relay, the first and the second relays being interconncted and the first motor for moving the carriage being switched on by actuation of the start switch. The advance movement of the carriage advantageously actuates the fourth switch, which reverses the second relay and thus the direction of movement of the first motor and the carriage, the fourth switch interconnecting the third relay with which it is connected to start the second motor for the take-up spool.

The switching circuits controlling the retardation of the movement of the carriage, the exposure time, the heating time and heating voltage of the rostrum, and the cooling of the heated recording material by the fan, all advantageously comprise RC-networks which may be actuated by a corresponding switch during manual operation of the recording apparatus.

Further details of the construction of the recording apparatus and in particular the design of its control and voltage supply unit are described in the sub-claims.

The advantage achieved by the present invention is that the recording of deformation images, such as of phase holograms or of alpha-numerical graphic representations, on a photo-thermoplastic recording material may be performed, either completely automatically or manually, with the various process steps following after one another, with a recording apparatus which is of compact structure and comprises all operational elements on a relatively small space.

The invention therefore comprises an apparatus having an exposure station, a means for supporting the recording medium at the exposure station, a means for charging the recording medium, carriage means for transporting the charging means across the recording medium to thereby charge the recording medium, means for moving the cariage means, and means for delaying the exposure of the recording medium at the exposure station by a delay time interval so as to permit vibrations in the apparatus resulting from the carriage movement to become substantially diminished, thereby preventing any degradation of image quality.

The invention is described in more detail be reference to the embodiments shown in the drawings, wherein.

Figure 1:
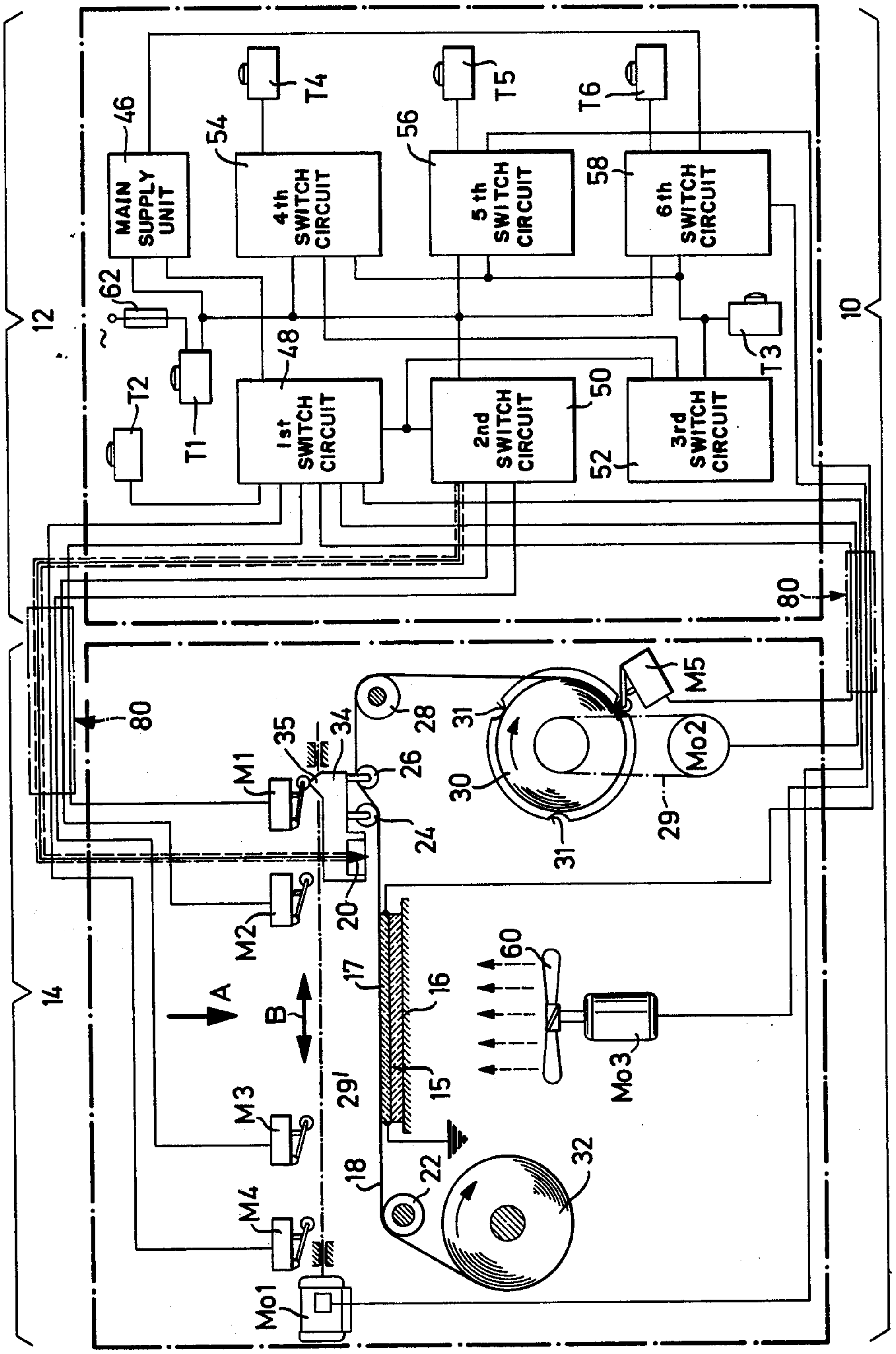
FIG. 1 is a diagrammatic view and block diagram of the invention.
Figure 2:
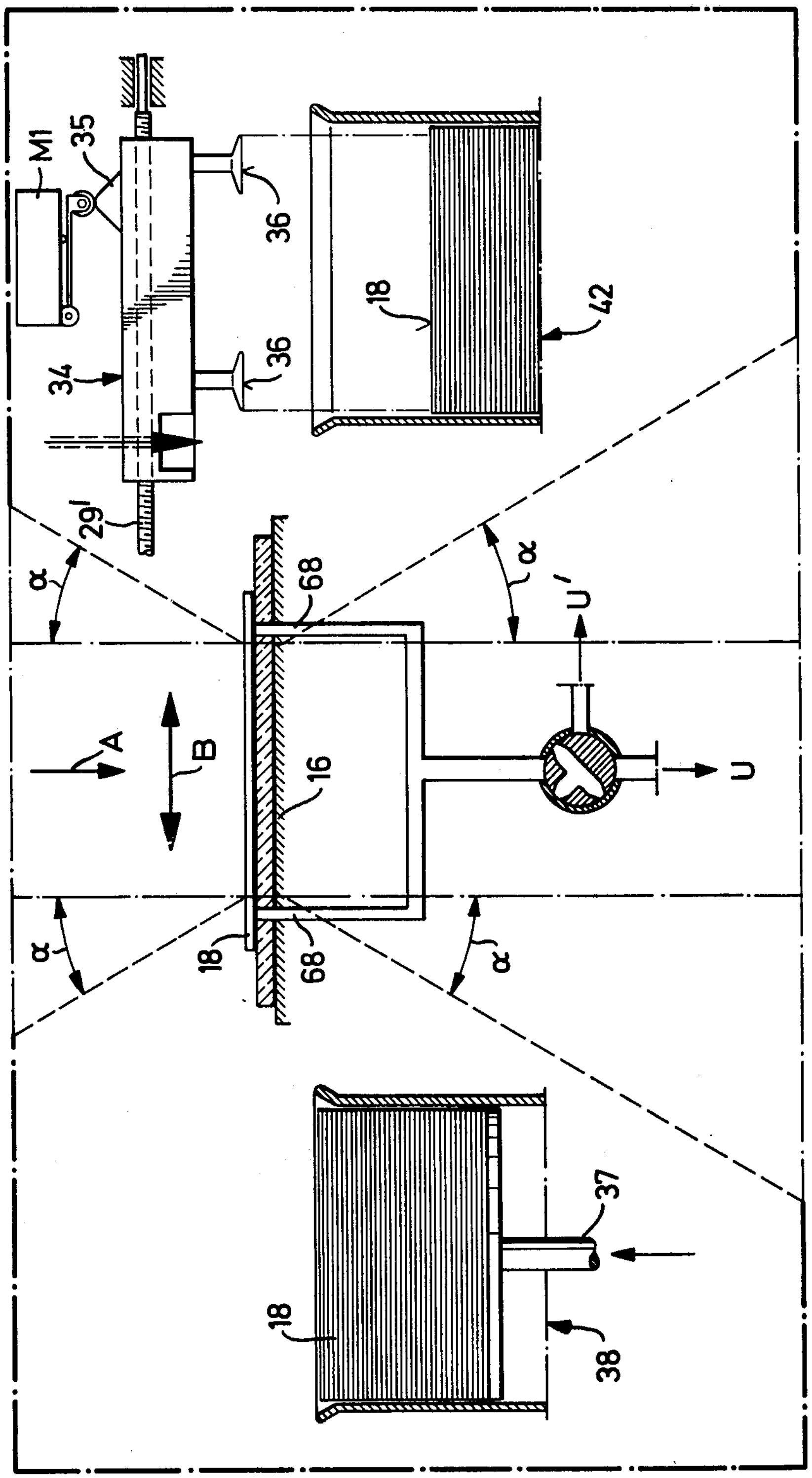
FIG. 2 is diagrammatic view of another version of the camera of the recording apparatus.

As shown in FIG. 1, the recording apparatus 10 consists of a camera 14 and a control and voltage supply unit 12 which are connected with each other by a multiwire cable 80. A recording material 18 which may be in the form of a wound-up web, is passed over a rostrum 16 which is positioned in an exposure station of the camera 14. The rostrum 16 comprises a transparent ransparent plate 15, for example a glass plate, which is provided with a transparent, electrically conductive layer 17. On the one hand, the electrically conductive layer 17 is earthed, and serves as the counter electrode to the electrod of the corona device 20 during electrostatic charging, on the other hand, it is connected with the output terminals of an adjustable filament transformer 56 and thus can be heated by a short voltage impulse. The recording material 18 is drawn off from a freewheeling delivery spool 32 and passed over a first guide roller 22, over the rostrum 16, a pressure roller 24, a lifting roller 26, and a second guide roller 28 to a take-up spool 30 which is driven by a second or feed motor M*o*2 through a toothed belt or chain 29. The pressure roller 24 and the lifting roller 26 are arranged on a sliding carriage 34, on the surface of the carriage facing the rostrum 16. They serve the purpose of facilitating the separation of the exposed recording material 18 from the layer 17 by displacement of the sliding carriage 34 in the direction B, the material 18 being lifted at a small angle to the plane of the rostrum 16 by the two rollers 24 and 26. The corona device 20 is mounted on the side of the sliding carriage whch faces the recording material 18 as best illustrated in FIG. 2. On the other side of the carriage, remote from the recording material 18, a cam 35 is provided which actuates first, second and third switches and a reversing switch, $M_1$, $M_2$, $M_3$, $M_4$ arranged along the path of the sliding carriage. The switches $M_1$ to $M_4$ may be microswitches. They are arranged outside the area of the rostrum 16. A first or reversible motor M*o*1, which drives for example a spindle 29' moving the carriage 34, is provided for reciprocating the sliding carriage 34 along the path of the recording material 18, as will be described in detail further down. The recording material 18 is arranged on the rostrum 16 in such a manner that the photo-thermoplastic recording layer 18' faces outwardly, away from the rostrum 16, and the back of the supporting material 18'' faces the electrically conductive, transparent layer 17 of the rostrum 16. In addition to the recording material 18, an intermediate web (not shown in the drawing) may be wound on the delivery spool 32 to prevent the photo-thermosplastic recording material 18' from sticking to itself when it is wound in a roll. This intermediate web may be wound on the take-up spool 30, or it may be removed in a manner not shown after being drawn off from the delivery spool 32.

Along the periphery of the driven take-up spool 30 grooves 31 are distributed which coact with an additional switch, $M_5$, during rotation of the spool 30, the switch $M_5$ being fixedly resting against the periphery of the spool. The switch contact of switch $M_5$ engages the passing groove 31 and thus stops the rotation of the take-up spool 30 and the feed of the recording material 18. The distance of two neighboring grooves 31 on the periphery of spool 30 is selected such that the time during which the sliding carriage 34 is transported from the switch contact of the fourth switch $M_4$ to the switch contact of the third switch $M_3$ equals the time in which the recording material 18 travels from one groove 31 to the next.

In the vicinity of the rostrum 16, a fan 60 is arranged which cools the heated recording material 18 and is driven by a third or cooling fan motor M*o*3.

The reciprocating movement of the carriage 34 is indicated by the double arrow B. Further devices which may be present, but are not shown in the drawings are, for example: a dust collector for cleaning the recording material and such fixtures as a blower and draw-off rolls for removal of the above mentioned intermediate web during winding-off of the recording material from the delivery spool.

Figure 1A:
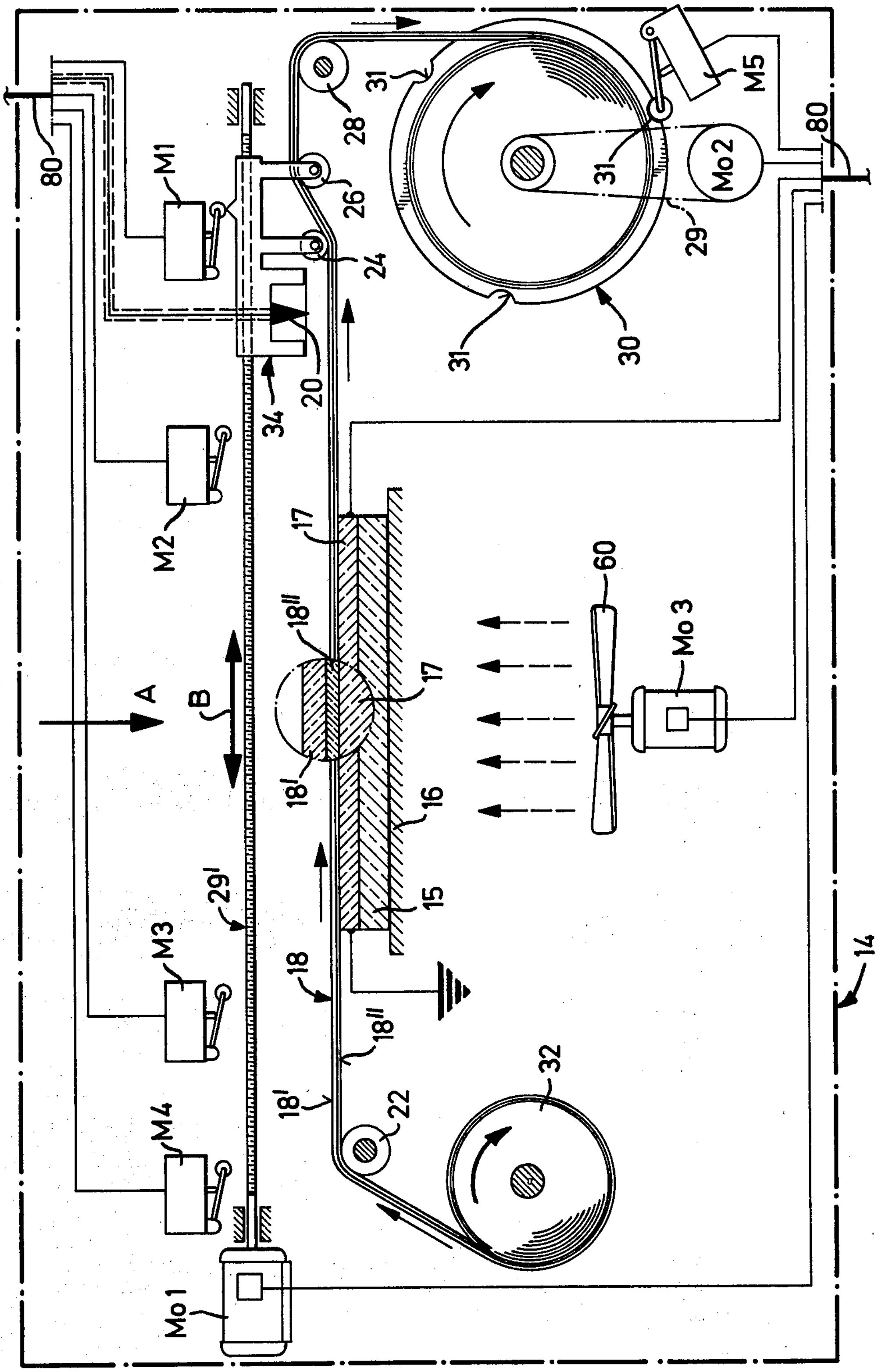
FIG. 1A is an enlarged view of the camera of the apparatus of FIG. 1.

When the carriage 34 in FIGS. 1 and 1A moves in the direction of the rostrum 16, the recording material 18 adhering to the layer 17 by electrostatic forces is lifted from the rostrum 16 by the lifting roller 26 and the lifted recording material 18 is advanced by the width of the rostrum. As soon as the cam 35 of the sliding carriage 34 touches the contact of switch $M_4$, the direction of movement of the motor M*o*1 is reversed and the sliding carriage 34 returns to its initial position. When the cam 35 contacts the switch $M_3$ during the return movement of the carriage, the high voltage supply of the corona device 20 is switched on and the recording material is electrostatically charged and thus sensitized. During the return travel of the sliding carriage 34, the pressure roller 24 presses the recording material 18 upon the rostrum 16 and, simultaneously, the recording material 18 is strongly attracted to the rostrum 16 by its electro static charge. When the cam of the sliding carriage 34 actuates the switch $M_2$ during its return movement, the high-voltage supply for the corona device 20 is switched off. When the limit switch $M_1$ is actuated by the cam 35, the sliding carriage 34 is stopped. Advantageously, mechanical vibrations caused by the movement of the carriage are allowed to subside before the material is exposed. The recording material 18 is exposed to radiation incident from the direction of the arrow A.

In the case of holograms, the stationary recording and developing processes offer the chance of a real-time observation, during which the holographically reconstructed image of the object is superseded by a direct, visual image of the object. By repeating some process steps, e.g. by double exposure prior to development, superimposed multiple-recordings in the sense of holographic interferometry are possible. For holographic recordings, a sufficiently large aperture angle $\alpha$ to the front and back of the rostrum 16 must be left open, as indicated in FIG. 2. This angle $\alpha$ may be up to 45°, for example.

In the embodiment according to FIG. 2, the recording material 18 is stacked in the form of single sheets in a supply station 38. The sheets lie on a vertically adjustable stamp 37 and are lifted and transported by pneumatic suction cups 36. The suction cups 36 are arranged on the side of the carriage 34 facing the rostrum 16. Laterally from the rostrum 16 there is a receiving station 42 for accommodating the exposed and developed recording material 18. In the zone of the rostrum 16 a holddownand lifting station is provided which has hollow conduits or bars 68 surrounding the rostrum. The hollow bars 68 can be used for pressing the recording material 18 onto the rostrum 16 by means of reduced pressure U or for lifting the sheets therefrom by means of excess pressure U′. For this purpose a three-way valve or three-way cock in the conduit to the hollow bars 68 connects these either with a suction station, (not shown) or with a pressure station, depending on the position of the three-way valve or three-way cock.

After exposure, the recording material 18 is heated by the electrically conductive and transparent layer 17 of the rostrum 16, so that the latent electrostatic charge image is converted into a deformation image.

Figure 3:
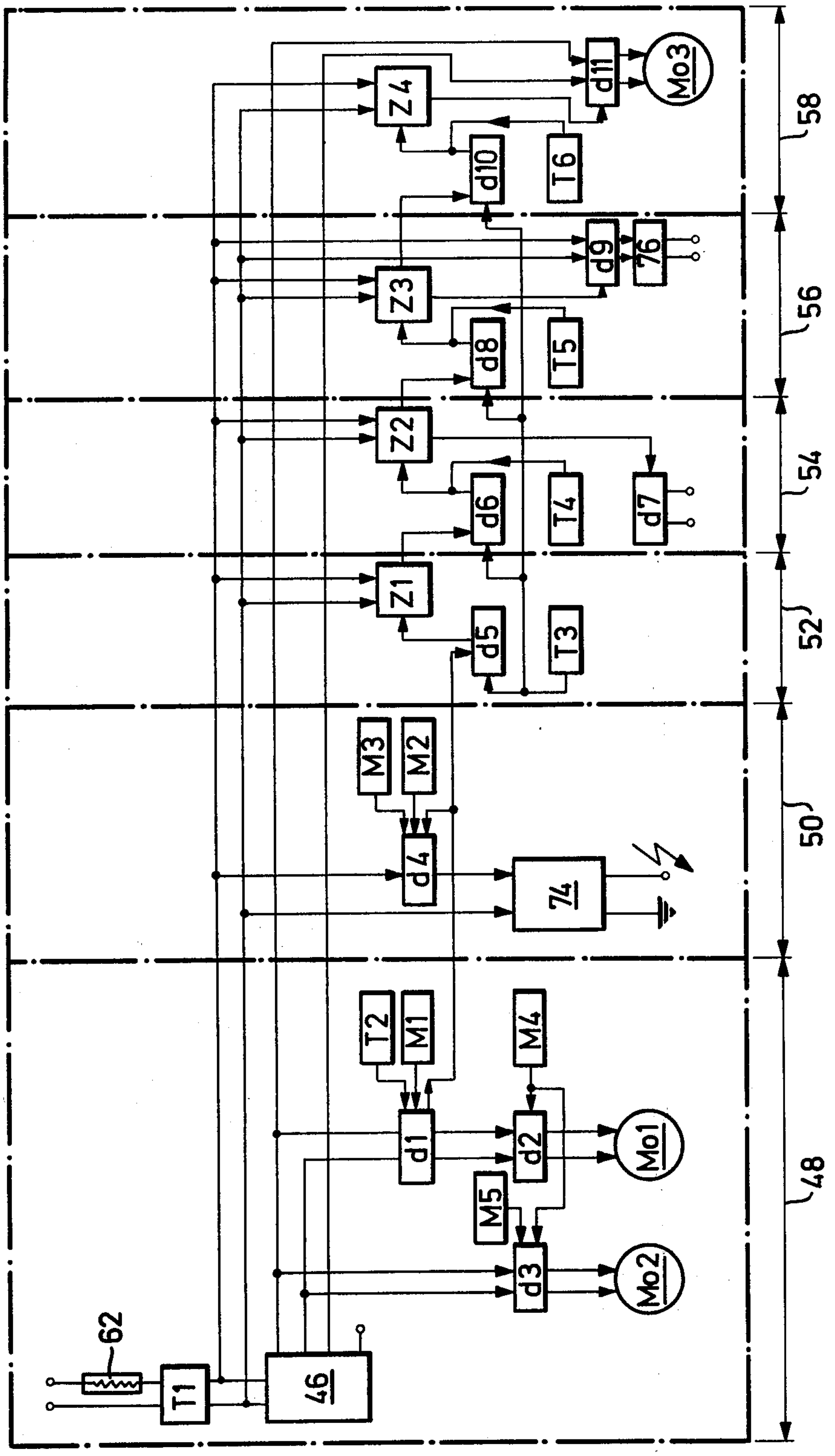
FIG. 3 shows the circuit diagram of the control and voltage supply unit.

In the following, the circuit design of the control and voltage supply unit 12 is described in detail by reference to FIG. 3.

The unit 12 is switched on and off by a mains switch $I_{,1}$ and is provided with a fuse 62. The mains supply unit 46, which is equipped with a rectifier (not shown), yields several different initial values for the voltage supply of the first, second, third, fourth, fifth and sixth switching circuits 48, 50, 52, 54, 56, 58 respectively. By pushing the start switch $T_2$ of the switching circuit 48, the two relays $d_1$ and $d_2$ are bridged and the motor M*o*1 is driven with a D.C. voltage of 6 volts, for example. As soon as the carriage 34 actuates the switch $M_4$ during its advance movement, the poles of the relay $d_2$ are changed so that the direction of travel of the sliding carriage 34 is reversed and the carriage returns to its initial position. The reversing switch $M_4$ is connected both to the relay $d_2$ and to the relay $d_3$, the latter interconnecting upon actuation of the reversing switch $M_4$, whereupon the film feed motor M*o*2 begins to run. When the take-up spool 30 begins to rotate because the motor M*o*2 begins to run, the switch $M_5$ for the film feed leaves the groove 31 and engages the neighboring groove 31. If three grooves are distributed over the periphery of the spool, as is normally the case, the take-up spool 30 will rotate over one third of its periphery while the switch $M_5$ releases one groove 31 and engages the next groove. As soon as the switch $M_5$ has engaged one of the grooves 31, the poles of the relay $d_3$ are changed, i.e. the relay is opened and the motor M*o*2 driving the take-up spool 30 is switched off. The distance of two neighboring grooves on the periphery of the take-up spool 30 is selected such that the time during which the sliding carriage 34 travels from the fourth switch $M_4$ to the third switch $M_3$ corresponds to the time which it takes for the recording material 18 to cover the distance between two neighboring grooves 31. When the carriage 34 returns to its initial position, it actuates the switch $M_3$ which is connected with a relay $d_4$ of the switching circuit 50 controlling the high voltage supply of the corona device 20. Relay $d_4$ then connects a high voltage transformer 74 in circuit with the corona device 20 to provide the corona device 20 with high voltage. The sliding carriage 34 with the corona device 20 is moved past the recording material 18 disposed on the rostrum 16 and the recording material is electrostatically charged. The camera 14 is now ready for recording. When the cam 35 on the carriage 34 actuates the switch $M_2$ connected to the relay $d_4$, the relay is opened, causing the voltage supply of the high voltage transformer 74 to be interrupted. In the further course of its backward movement, the cam 35 of the carriage 34 actuates the limit switch $M_1$, which switches off the whole control and voltage supply unit 12, the whole unit meaning not only the high voltage supply for the corona device 20, but also the drives for the sliding carriage 34 and for the film feed, which are separated from the voltage supply by opening the relay $d_1$ connected with the limit switch $M_1$. By actuating the switch $M_1$, the relays $d_1$ and $d_4$ are opened, whereas the relay $d_5$ in the switching circuit 52, which is connected with relay $d_1$, is closed when the movement of the carriage is retarded.

Upon actuation of the switch $T_3$, which acts as a selector switch for automatic or manual operation of the recording apparatus 10, the relays $d_5$, $d_6$, $d_8$, and $d_{10}$ in the switching circuits 52 to 58, which are connected with this switch, are released. If the relay $d_5$ is closed by the selector switch $T_3$, an RC-network $Z_1$ is actuated thereby delaying exposure. Thus, the beginning of the exposure of the recording material 18 is delayed as controlled by network $Z_1$ in order to allow any mechanical vibrations of the sliding carriage 34 to die away. The RC-network $Z_1$ is connected with the relay $d_6$ of the switching circuit 54 which controls the duration of exposure. After the delay duration specified by the time constant of RC-network $Z_1$, an output impulse from network $Z_1$ is fed to RC-network $Z_2$ via relay $d_6$ and thence to RC-network $Z_3$ via relay $d_8$ and finally to RC-network $Z_4$ via relay $d_{10}$. In this manner, one switching circuit after the other is set in operation. Relay $d_6$ is part of switching circuit 54 which controls the exposure duration; relay $d_8$ is part of switching circuit 56 which controls thermal development, and relay $d_{10}$ is part of switching circuit 58 which controls cooling of the recording material 18. The RC-network $Z_2$ operates the relay $d_7$ which controls the speed of an electronic shutter which may be an integrated component of the recording apparatus 10 or may be arranged, as a separate structural unit, outside of the recording apparatus 10 and connected with it by a cable. The RC-network $Z_3$ closes the relay $d_9$, thus switching on a filament transformer 76 which serves to heat the layer 17 of the rostrum 16. The filament transformer 76 is variable as regards its secondary voltage. The RC-network $Z_4$ closes a relay $d_{11}$, thus supplying the necessary voltage to the motor Mo3 driving the fan.

If the selector switch $T_3$ is switched over into the position for manual operation of the recording apparatus 10, the relays $d_5$, $d_6$, $d_8$ and $d_{10}$ are opened. The switching circuits 54, 56, and 58, which control exposure, thermal development of the recording material, and cooling of the exposed recording material 18, may then be manually operated, through appropriate switches $T_4$, $T_5$, and $T_6$, which are directly connected to the RC-networks $Z_2$, $Z_3$, and $Z_4$.

If a mechanical shutter is used, the electronically operated shutter may be disregarded; it is, however, necessary for the automatic operation of the recording process. For example, the beginning of exposure may be delayed for from 0 to 30 seconds, in order to wait for possible mechanical vibrations of the carriage 34 to die away. The exposure time is adjusted to values between 1/100 sec. and 3 seconds, depending on the light energy in the visible range of the spectrum used for exposure, which ranges from 50 to 400 erg/cm$^2$. The voltage impulse for the thermal development of the recording material 18 may range from a few volts to more than 100 volts and last from a few seconds to one tenth of a second when an area of 20 × 30 mm of the recording material is to be exposed which has a resistance of 12 Ohm, measured over the width of 20 mm of the recording material.

The above data in no way limits the scope of the present invention, but is only given for the purpose of illustrating the size of the operational parameters, the various adjustment values and other operational data being determined by the properties of the recording material employed and by the optical and mechanical design of the recording apparatus.

We claim:

1. A recording apparatus for recording information on a photoconductive thermoplastic recording medium comprising:

transporting means for feeding said recording medium to and removing it from an exposure station for image-wise exposure of said information onto said recording medium, an exposure station including a heatable rostrum means, means for supporting said recording medium at said exposure station, means for charging said recording medium, carriage means for transporting said charging means across said recording medium thereby charging said recording medium, heating means for the control of the time of heating of said rostrum means, means for moving said carriage means, and means for delaying exposure at said exposure station by a delay time interval to permit vibrations in said apparatus from said transported carriage to substantially diminish.

2. Apparatus as recited in claim 1 further comprising means actuated by said carriage means for automatically starting said delaying means upon the arrival of said carriage means at a predetermined position.

3. Apparatus as recited in claim 1 wherein said delay time interval is variable.

4. Apparatus as recited in claim 1 wherein said means for moving said carriage means comprises a reversible motor and said apparatus further comprises reversing switch means operated by said carriage means for reversing the direction of said reversible motor thereby moving said charging means in a first and second opposite direction.

5. Apparatus as recited in claim 4 further comprising:

a. a first switch actuated by said carriage means for turning off said reversible motor after charging of said recording medium, b. a second switch actuated by said carriage means for switching off said charging means before actuation of said first switch, and c. a third switch actuated by said carriage means for switching on said charging means before actuation of said second switch.

6. Apparatus as recited in claim 4 wherein said first, second and third switches and said reversing switch means are actuated by a cam positioned on said carriage means.

7. Apparatus as recited in claim 1 further comprising a plate mounted on said rostrum means, said plate having an electrically conductive layer thereupon and said recording medium positioned on said electrically conductive layer during exposure.

8. Apparatus as recited in claim 7 wherein said plate is transparent and is grounded during charging of said recording medium thereby acting as a counter-electrode to the charging means.

9. Apparatus as recited in claim 8 wherein said charging means is a corona device.

10. Apparatus as recited in claim 8 wherein said plate is heated by said heating means for producing a deformation image.

11. Apparatus as recited in claim 10 further comprising means for varying the heat of said plate, said means for varying the heat of said plate comprising an RC-network.

12. Apparatus as recited in claim 1 wherein said recording medium comprises a flexible support having a photoconductive thermoplastic recording layer disposed thereon.

13. Apparatus as recited in claim 12 wherein said transporting means for feeding said recording medium includes a delivery spool and take-up spool, said recording medium passing from said delivery spool across said supporting means and onto said take-up spool, said take-up spool driven by a feed motor.

14. Apparatus as recited in claim 13 further comprising a pressure roller and a lifting roller attached to said carriage means, said recording medium passing below said pressure roller and over said lifting roller, said rolers positioned on said carriage means adjacent said supporting means.

15. Apparatus as recited in claim 13 wherein said feed motor is operated to drive said take-up spool by means of an additional switch and said reversing switch means, said additional switch actuated by said take-up spool.

16. Apparatus as recited in claim 15 wherein said additional switch is deactivated to turn off said feed motor upon a predetermined rotation of said take-up spool.

17. Apparatus as recited in claim 1 wherein said recording medium comprises a plurality of stacked sheets and means for moving said sheets into said exposure station.

18. Apparatus as recited in claim 17 wherein said sheet moving means comprises pneumatic suction means.

19. Apparatus as recited in claim 17 wherein said exposure station comprises pressure means for pressing said recording medium onto said supporting means.

20. Apparatus as recited in claim 19 wherein said pressure means comprises hollow conduits for connection to pressure reducing means.

21. Apparatus as recited in claim 1 wherein said recording medium comprises a support with a photoconductive layer disposed thereon, said means for moving said carriage means comprises a reversible motor and said means for transporting said recording medium comprises a feed motor connected to drive a take-up spool for receiving said exposed recording medium.

22. Apparatus as recited in claim 21 wherein said charging means is controlled by a first switching circuit, said first switching circuit comprising a first and a second relay connected in series with said reversible motor for moving said carriage means and a third relay connected to said feed motor.

23. Apparatus as recited in claim 22 further comprising:

a. a first switch actuated by said carriage means for turning off said reversible motor after charging of said recording medium,
b. a second switch actuated by said carriage means for switching off said charging means before actuation of said first switch,
c. a third switch actuated by said carriage means for switching on said charging means before actuation of said second switch, and
d. reversing switch means operated by said carriage means for reversing the direction of said reversible motor.

24. Apparatus as recited in claim 23 wherein the carriage means actuates the reversing switch means for changing poles of said second relay thereby reversing the direction of running of the reversible motor and the direction of travel of the carriage means, said reversing switch means closing the third relay thus starting the feed motor for the take-up spool.

25. Apparatus as recited in claim 22 further comprising a second switching circuit for connecting said charging means to a power main through a high voltage transformer thereby supplying voltate to the charging means, said second switching circuit comprising a fourth relay connected between said charging means and said power main, said second and third switches connected to said fourth relay, the third switch interconnecting the fourth relay and the second switch opening the fourth relay.

26. Apparatus as recited in claim 25, further comprising a third switching circuit controlling the delay time interval and comprising a first RC-network actuated by a fifth relay, said fifth relay being connected to a selector switch for closing said fifth relay.

27. Apparatus as recited in claim 26 wherein said first relay is connected with the fifth relay which closes when the reversing switch means is actuated while the first relay opens simultaneously.

28. Apparatus as recited in claim 27, wherein the first RC-network is connected with a sixth relay connected in a fourth switching circuit for controlling the exposure time of the recording medium and said fourth switching circuit comprises a seventh relay which is connected with the output of a second RC-network for controlling an electronic shutter of the exposure station and, for manual starting operation, an exposure switch is connected with said second RC-network.

29. Apparatus as recited in claim 28 further comprising a fifth switching circuit for controlling the heating time of the recording medium said fifth switching circuit comprising a third RC-network which is connected with the second RC-network by an eighth relay, the output signal of the third RC-network actuating a ninth relay connected with it which controls the switching on and off of an adjustable filament transformer for controlling said heating, said fifth switching circuit further comprising a heating switch connected with the third RC-network for manual switching.

30. Apparatus as recited in claim 29 further comprising a sixth switching circuit controlling the cooling of the heated recording medium and comprising a fourth RC-network, the output signal of which controls an eleventh relay for operating a cooling fan motor and a tenth relay connecting the fourth RC-network with the third RC-network.

31. Apparatus as recited in claim 30 further comprising a ventilator switch for the manual operation of the fourth RC-network.

32. Apparatus as recited in claim 31 further comprising a selector switch used for switching from automatic to manual operation, said selector switch connected with said sixth, eighth and tenth relays.

* * * * *

UNITED STATES PATENT OFFICE

CERTIFICATE OF CORRECTION

Patent No. 4,034,381 Dated July 5, 1977

Inventor(s) Roland Moraw and Gunther Schadlich

It is certified that error appears in the above-identified patent and that said Letters Patent are hereby corrected as shown below:

In column 1, line 36, change "is", second occurrence, to --in--.

In column 2, line 60, correct "pnuematic" to read --pneumatic--.

In column 4, line 2, delete "ransparent";

line 24, change "whch" to --which--; and line 44, change "photo-thermosplastic" to --photo-thermoplastic--.

In column 5, line 24, change "electro static" to --electrostatic--;

line 55, change "holddownand" to --holddown and--; and line 56, change "surronding" to --surrounding--.

UNITED STATES PATENT OFFICE
CERTIFICATE OF CORRECTION

Patent No. 4,034,381 Dated July 5, 1977

Inventor(s) Roland Moraw and Gunther Schadlich

It is certified that error appears in the above-identified patent and that said Letters Patent are hereby corrected as shown below:

In column 6, line 5, change "$I,_1$" to --$T_1$--.

In claim 6, line 1, change "4" to --5--.

In claim 14, line 5, change "rolers" to --rollers--.

In claim 25, line 4, change "voltate" to --voltage--.

Signed and Sealed this

*Twenty-ninth* Day of *November 1977*

[SEAL]

*Attest:*

RUTH C. MASON
*Attesting Officer*

LUTRELLE F. PARKER
*Acting Commissioner of Patents and Trademarks*